(12) United States Patent
Shekhar et al.

(10) Patent No.: US 11,714,783 B2
(45) Date of Patent: *Aug. 1, 2023

(54) BROWSABLE DATA AND DATA RETRIEVAL FROM A DATA ARCHIVED IMAGE

(71) Applicant: NetApp Inc., San Jose, CA (US)

(72) Inventors: Sisir Shekhar, Bihar (IN); Rakesh Bhargava M R, Bangalore (IN); Krishna Murthy Chandraiah Setty Narasingarayanapeta, Bangalore (IN)

(73) Assignee: NetApp, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/408,532

(22) Filed: Aug. 23, 2021

(65) Prior Publication Data

US 2021/0382848 A1 Dec. 9, 2021

Related U.S. Application Data

(63) Continuation of application No. 15/140,657, filed on Apr. 28, 2016, now Pat. No. 11,100,044.

(51) Int. Cl.
*G06F 16/00* (2019.01)
*G06F 16/14* (2019.01)
*G06F 16/11* (2019.01)
*G06F 16/16* (2019.01)

(52) U.S. Cl.
CPC ......... *G06F 16/148* (2019.01); *G06F 16/113* (2019.01); *G06F 16/168* (2019.01)

(58) Field of Classification Search
CPC ..... G06F 16/148; G06F 16/113; G06F 16/168
See application file for complete search history.

(56) References Cited

U.S. PATENT DOCUMENTS

| | | | |
|---|---|---|---|
| 8,190,850 B1 * | 5/2012 | Davenport | G06F 16/10 711/170 |
| 8,386,733 B1 * | 2/2013 | Tsaur | G06F 11/1458 711/163 |
| 9,098,432 B1 * | 8/2015 | Bachu | G06F 11/1453 |
| 9,569,446 B1 * | 2/2017 | Feathergill | G06F 16/128 |
| 2013/0019057 A1 | 1/2013 | Stephens et al. | |
| 2016/0011946 A1 * | 1/2016 | Simon | G06F 11/1469 714/19 |

* cited by examiner

*Primary Examiner* — Dinku W Gebresenbet
(74) *Attorney, Agent, or Firm* — Cooper Legal Group, LLC

(57) ABSTRACT

A request is received to retrieve at least a portion of a file from a compressed data archived image stored in a backup storage device. The compressed data archived image comprises a backup of a file system having a number of directories and a number of files. The compressed data archived image comprises a file that includes a compression of the number of files. An address of the at least the portion of the file within the compressed data archived image is determined. The at least the portion of the file is retrieved at the address in the compressed data archived image, without decompressing the compressed data archived image.

20 Claims, 9 Drawing Sheets

BROWSABLE DATA AND DATA RETRIEVAL FROM A DATA ARCHIVED IMAGE

RELATED APPLICATION

This application claims priority to and is a continuation of U.S. patent application Ser. No. 15/140,657, filed on Apr. 28, 2016 and titled "BROWSABLE DATA AND DATA RETRIEVAL FROM A DATA ARCHIVED IMAGE," which is incorporated herein by reference.

BACKGROUND

The disclosure generally relates to the field of data processing, and more particularly to browsable data and data retrieval from a data archived image.

Data on a storage device can be periodically archived to a backup storage device to ensure that the data can be recovered in case of data loss or corruption on the storage device. A conventional approach for data backup includes tape drives as the backup storage devices. With the advent of cloud-based storage, a cloud-based storage device can now be used for backup storage to archive data. Also, some organizations are now moving their data archived images from tape drives to cloud-based storage devices.

Additionally, there is now an increasing market to provide analytics services of data in the data archived images. Analytics of the data archived images can include analytics of the data (e.g., the files) and the associated metadata. Typically, analytics need to be performed on a subset of the data archived image. For example, analytics may be performed on data in a portion of a file or a file in the data archived image.

BRIEF DESCRIPTION OF THE DRAWINGS

Aspects of the disclosure may be better understood by referencing the accompanying drawings.

DESCRIPTION

Figure 1:
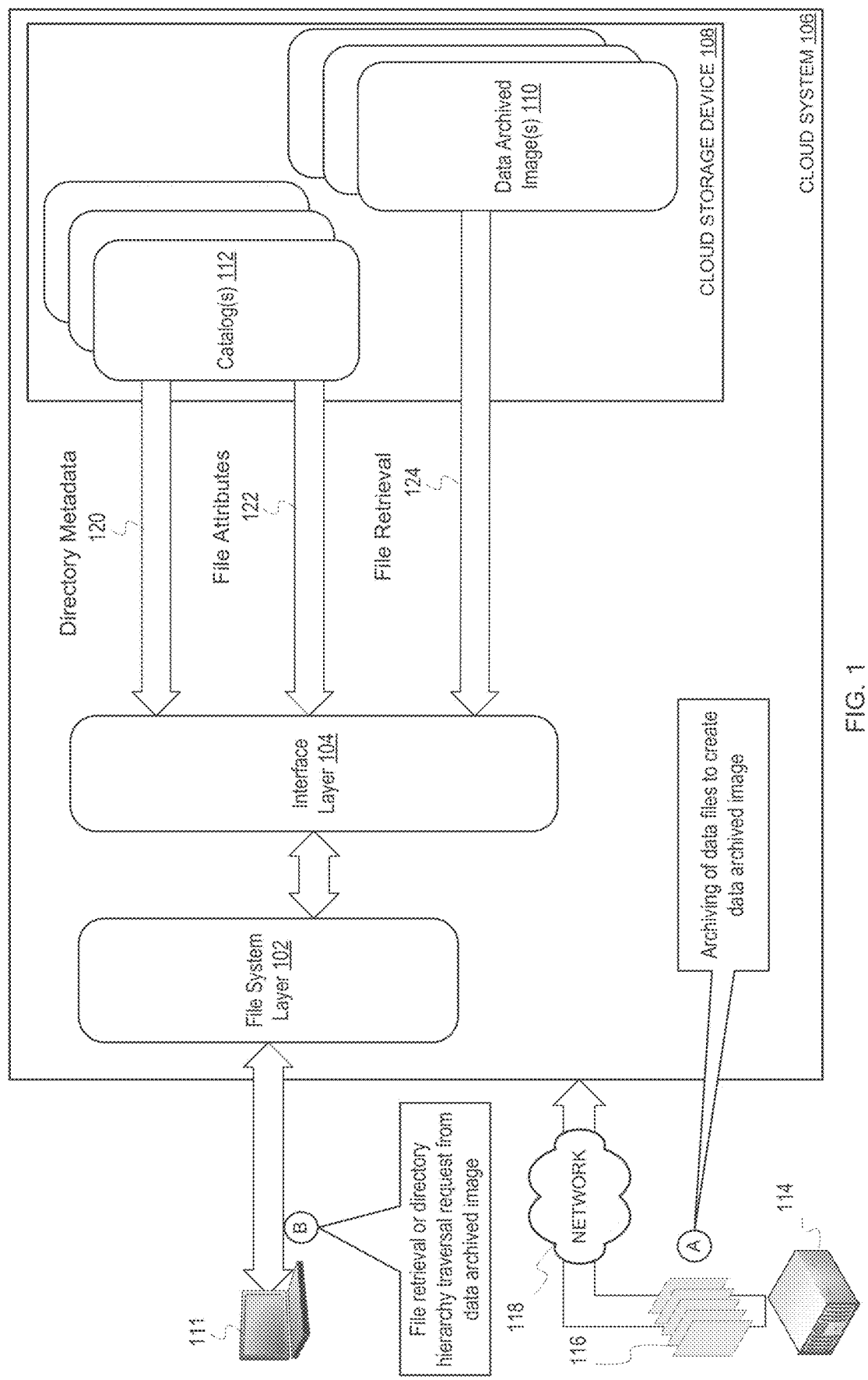
FIG. 1 depicts an example system for browsable data and data retrieval from a data archived image.

The description that follows includes example systems, methods, techniques, and program flows that embody aspects of the disclosure. However, it is understood that this disclosure may be practiced without these specific details. For instance, this disclosure refers to retrieval of a file or a portion of a file from a data archived image. But aspects of this disclosure can be applied for retrieval of any type or size of data within the data archived image. In other instances, well-known instruction instances, protocols, structures and techniques have not been shown in detail in order not to obfuscate the description.

Overview

A file system having a number of files in a directory hierarchy can be backed up to different types of backup storage devices. For example, a file system in a storage volume can be periodically backed up into a compressed data archived image. Compressed data archived images can be periodically stored in different backup storage devices. Examples of the different backup storage devices include disk storage devices, solid state storage devices, tape drives, cloud-based storage, local storage, etc.

Some aspects include an interface layer that interprets a compressed data archived image to enable retrieval of the files or portions of files contained in the archived image without decompressing the entire archived image. This is in contrast to conventional approaches. For example, using conventional approaches, if a user is to access a particular file from a compressed archived image stored in a backup storage device, the compressed archived image needs to be retrieved from the storage media and then decompressed. The particular file could then be extracted from the decompressed image and provided to the user. Using these conventional approaches can be even more time consuming if the archived image is backed up to a storage device over a network (e.g., a cloud-based storage device) because of the time delay for retrieving the image over a network.

The interface layer can also provide for browsing of the files and the directory hierarchy of the files in the compressed data archived image without decompressing the entire compressed data archived image. An interface can be provided to allow a user to traverse the directory hierarchy to locate a file. For example, a Graphical User Interface (GUI) can be provided for accessing the files and the directory hierarchy of the files. The interface layer can then provide updates to the interface based on inputs from the user traversing the directory hierarchy. For example, if a user selects a directory, the interface layer can provide the files and directories within the directory to be presented on the interface. These updates to the interface can be provided without decompressing the data archived image.

Terminology

This description uses the terms "browsing" and "browsable data" which are in reference to traversing a file directory structure that can include any number of files and directories. The file directory structure can be configured in a hierarchical tree structure. The browsing can include moving or traversing the structure (either up or down) to view or locate files or directories within the structure. For example, browsing can include moving "down" the hierarchical tree structure based on selection of a directory to cause display of the files and directories contained in the selected directory. Alternatively, browsing can include moving "up" the hierarchical tree structure based on selection of a directory to cause display of files and sub-directories at the same level as the selected directory.

This description uses shorthand terms related to cloud technology for efficiency and ease of explanation. When referring to "a cloud system," this description is referring to the resources of a cloud service provider. For instance, a cloud system or cloud can encompass the servers, virtual machines, and storage devices of a cloud service provider. A device of a cloud refers to an entity that has a network address that can be used as an endpoint for a network connection. The entity may be a physical device (e.g., a server) or may be a virtual entity (e.g., virtual server or virtual storage device).

This description uses the term "stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream may be characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

Example System Architecture

FIG. 1 depicts an example system for browsable data and data retrieval from a data archived image. FIG. 1 includes a cloud system 106, a client device 111, and a file server 114. The cloud system 106 is communicatively coupled to the client device 111 and the file server 114. In this example, the cloud system 106 is communicatively coupled to the file server 114 via a network 118. The file server 114 stores data in a file system that can be stored across one or more volumes. For example, the file server 114 can store data in a number of files within a number of directories (e.g., a hierarchy of directories) across the one or more volumes.

The cloud system 106 includes a cloud storage device 108, an interface layer 104, and a file system layer 102. The cloud storage device 108 can be a hard disk, a magnetic storage device, an optical storage device, flash memory, flash disk arrays, etc. and any combination thereof. The file system layer 102 interacts with the interface layer 104. The interface layer 104 reads data from the cloud storage device 108. The cloud system 106 stores data archived images. The cloud system 106 also provides for browsable data and data retrieval from the data archived images without decompressing the images. In other examples, other types of storage systems can perform the functionality described herein. For example, any other type of local or network-attached backup storage devices can perform such functionality. Also, the interface layer 104 and the file system layer 102 are depicted as part of the cloud system 106. In other examples, the interface layer 104 and/or the file system layer 102 can be within other systems or devices. For example, either layer 102 or 104 can be executing in the client device 111 or any other type of device that is to access resources of the cloud system 106 and the client device 111. Examples of the file system layer 102 include a Filesystem in UserSpace (FUSE) and a Virtual FileSystem (VFS).

FIG. 1 is annotated with a series of letters A-B. These letters represent stages of operations, with each stage representing one or more operations. Although these stages are ordered for this example, the stages illustrate one example to aid in understanding this disclosure and should not be used to limit the claims. Subject matter falling within the scope of the claims can vary with respect to the order and some of the operations.

At stage A, the file server 101 streams data (i.e., a data stream 116) from a file system to be backed up in a data archived image in the cloud system 106 via a network 118. For example, the file server 101 can stream files in a directory-based hierarchy stored in a volume to the cloud system 106. The file server 101 communicates the metadata of the files (e.g., permissions, size, etc.), which are in the inode structures, and the file data, which are in the file data blocks. The file server 101 and the cloud storage system 106 can have previously agreed upon or be configured to provide and consume the data stream 116 in a manner that allows the cloud storage system 106 to store the files and associated metadata as the data archived image 110 and associated catalog 112. In some aspects, each data archived image 110 is compressed in a single archive file. An example format of the files and associated metadata stored in the data archived image 110 and the associated catalog 112 are depicted in FIGS. 2-7, which are described in more detail below.

As shown, multiple data archived images 110 and associated catalogs 112 can be stored in the cloud storage device 108. The data archived images 110 and associated catalogs 112 can be from a same device in which the files on the device are periodically backed up to the cloud storage device 108. Alternatively or in addition, the data archived images 110 and associated catalogs 112 can be from different devices (e.g., file servers) such that the data archived images 110 and the associated catalogs 112 are archives of files in different file systems stored on different devices.

At stage B, the client device 111 performs either a file retrieval or a traversal of the directory structure of the file system that is stored in one of the data archived images 110. As further described below, either operation can be performed without decompressing the entire data archived image 110. If a directory is selected for directory traversal, the interface layer 104 retrieves directory metadata 120 from an inode for the selected directory from the catalog 112. The directory metadata 120 can include identification of any files and any directories that are contained in the directory.

If a file is selected for retrieval, the interface layer 104 retrieves the inode (including file attributes 122) for the selected file from the catalog 112. As further described below, the interface layer 104 uses a value or identification of the inode to map the inode for the selected file to an offset address where the content of the selected file is stored in the data archived image 110. Mappings between the inodes and offset address of the content of the files can be stored in the data archived image 110. The content of each file can be contiguously stored in the data archived image 110, thereby allowing retrieval to be easier and faster in comparison to retrieval from data archived images that do not include contiguous storage of file content. The interface layer 104 can then retrieve the selected file from the data archived image 110 at the determined offset address therein (see file retrieval 124). A more detailed description of the directory traversal and file retrieval from a data archived image (without decompressing the image) is set forth below in reference to FIGS. 2-7.

Example Filesystem Interface, Catalog, and Data Archived Image

Figure 2:
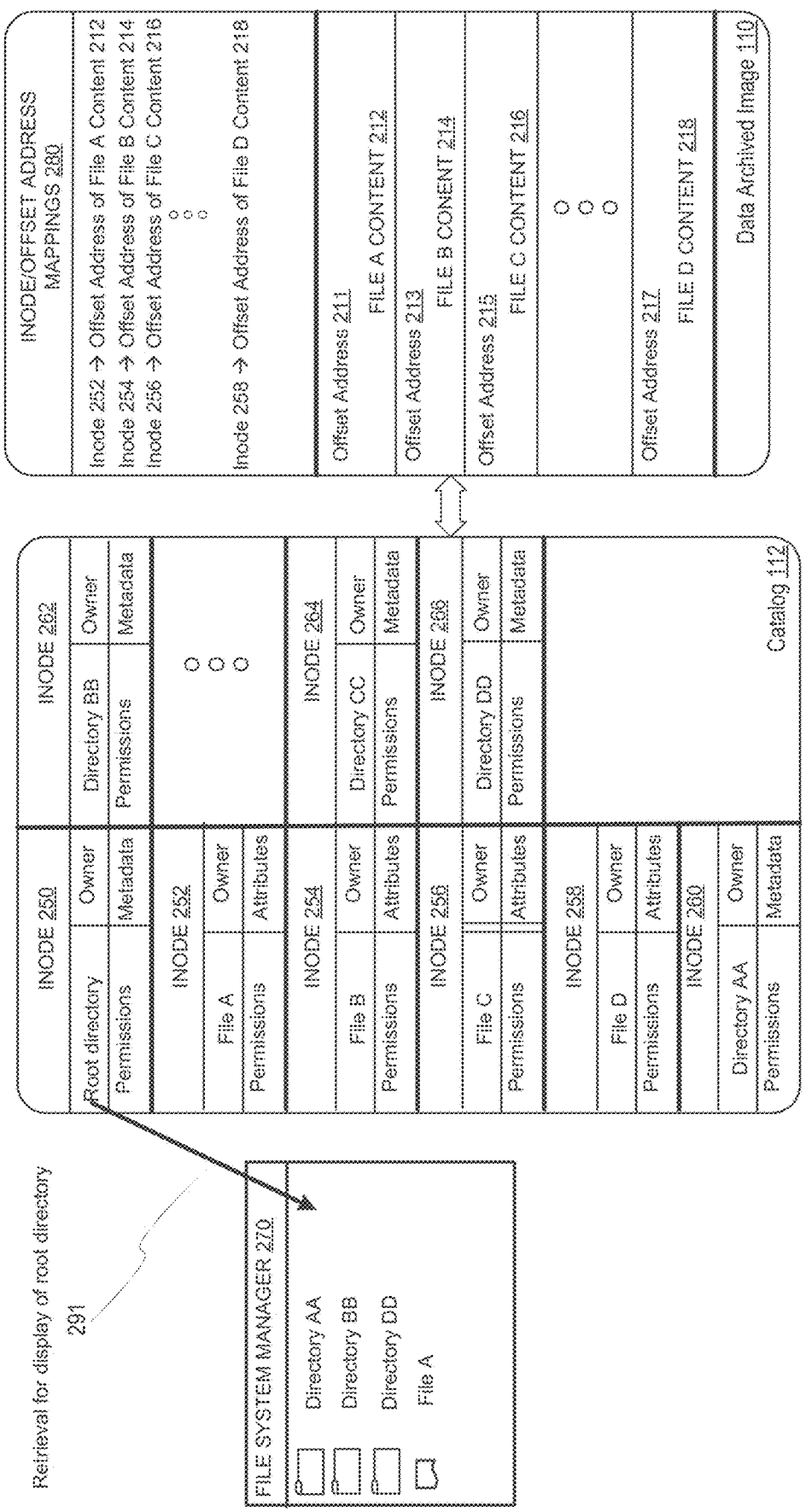
FIG. 2 depicts example relationships among a file system manager interface and data stored in a catalog and a data archived image, in response to an initial access of the data archived image.

To illustrate, FIGS. 2-5 and 7 depict example relationships among a file system manager interface and data stored in a catalog and a data archived image at different stages of operations for file retrieval and directory traversal. FIG. 2 depicts example relationships among a file system manager interface and data stored in a catalog and a data archived image, in response to an initial access of the data archived image.

In particular, FIG. 2 depicts the interactions among a file system manager 270, the catalog 112, and the data archived image 110. The file system layer 102 of FIG. 1 provides the file system manager 270 which comprises a Graphical User Interface (GUI) that can be presented to a user who accesses the data archived image 110 using the client device 111. The file system manager 270 includes an interface of an example directory structure of files stored in the data archived image 110. The example directory structure includes a directory AA, a directory BB, a directory DD, and a file A.

The catalog 112 includes the inode data structures for the directories and files of the file system stored in the data archived image 110. The inodes include various metadata and attributes for each of the directories and the files from the file system that has been archived in the data archived image 110. In this example, the catalog 112 includes an inodes 250-266. The inode 250 is the inode for the root directory for the data archived image. The root directory is the top most directory in the directory hierarchy for the data archived image 110. The inode 250 includes the name of the directory (root directory), the owner of the directory, the permissions of the directory, and other metadata for the directory. The other metadata for the directory can include any files and any directories that are contained in the directory.

The inode 252 is the inode for the file A. The inode 252 includes the name of the file—file A, the owner of the file, the permissions for the file, and other attributes for the file. Other attributes for the file can include time and date of creation, time and date of last update, etc. The inode 254 is the inode for the file B. The inode 254 includes the name of the file—file B, the owner of the file, the permissions for the file, and other attributes for the file. The inode 256 is the inode for the file C. The inode 256 includes the name of the file—file C, the owner of the file, the permissions for the file, and other attributes for the file. The inode 258 is the inode for the file D. The inode 258 includes the name of the file—file D, the owner of the file, the permissions for the file, and other attributes for the file.

The inode 260 includes the name of the directory (directory AA), the owner of the directory, the permissions of the directory, and other metadata for the directory. The inode 262 includes the name of the directory—directory BB, the owner of the directory, the permissions of the directory, and other metadata for the directory. The inode 264 includes the name of the directory (directory CC), the owner of the directory, the permissions of the directory, and other metadata for the directory. The inode 266 includes the name of the directory (directory DD), the owner of the directory, the permissions of the directory, and other metadata for the directory.

The data archived image 110 stores address mappings (inode/offset address mappings 280 (hereinafter "the address mappings 280")) between values of the inodes stored in the catalog 112 and the offset addresses where content of the files are stored in the data archived image 110. The address mappings 280 include a mapping from the inode 252 for the file A to the offset address where content 212 included in file A is stored in the data archived image 110. The address mappings 280 include a mapping from the inode 254 for the file B to the offset address where content 214 included in file B is stored in the data archived image 110. The address mappings 280 include a mapping from the inode 256 for the file C to the offset address where content 216 included in file C is stored in the data archived image 110. The address mappings 280 include a mapping from the inode 258 for the file D to the offset address where content 218 included in file D is stored in the data archived image 110.

The data archived image 110 also includes the content for each of the files. In some aspects, the content for each file is contiguously stored in the data archived image 110. As further described below, this contiguous storage of a file enables the interface layer 104 to more quickly and easily extract a file from the data archived image 110 without decompressing the data archived image 110. The content 212 of file A is stored at an offset address 211 in the data archived image 110. The content 214 of file B is stored at an offset address 213 in the data archived image 110. The content 216 of file C is stored at an offset address 215 in the data archived image 110. The content 218 of file D is stored at an offset address 217 in the data archived image 110.

The initial display of the interface of the file system manager 270 shown in FIG. 2 includes the root directory of the data archived image 110. This initial display can be in response to a user selecting a data archived image. For example, the interface prior to the display depicted in FIG. 2 can include a number of data archived images. The user can select one of the data archived images. Each data archived image can be associated with a catalog. With reference to FIG. 1, in response to selection of the data archived image 110, the file system layer 102 sends a request to the interface layer 104 for the directories and files in the root directory of the data archived image 110. The file system layer 102 can provide identification of the selected data archived image to the interface layer 104. The interface layer 104 then resolves the selected data archived image to the associated catalog. The interface layer 104 can then retrieve the data for the root directory for the catalog. In this example, the interface layer 104 retrieves from the catalog 112 the inode 250 which is the inode for the root directory for the data archived image 110 (see retrieval 291). The inode 250 includes metadata that provides what directories and files are included in the root directory. In this example, the metadata indicates that that directories and files in the root directory include the directory AA, the directory BB, the directory DD, and the file A. The interface layer 104 returns the names of the directories and files in the root directory to the file system layer 102. The file system layer 102 can then update the interface of the file system manager 270 as depicted in FIG. 2. Accordingly, the user is able to browse and navigate the directory structure of the data archived image 110 without decompression of the data archived image 110.

Figure 3:
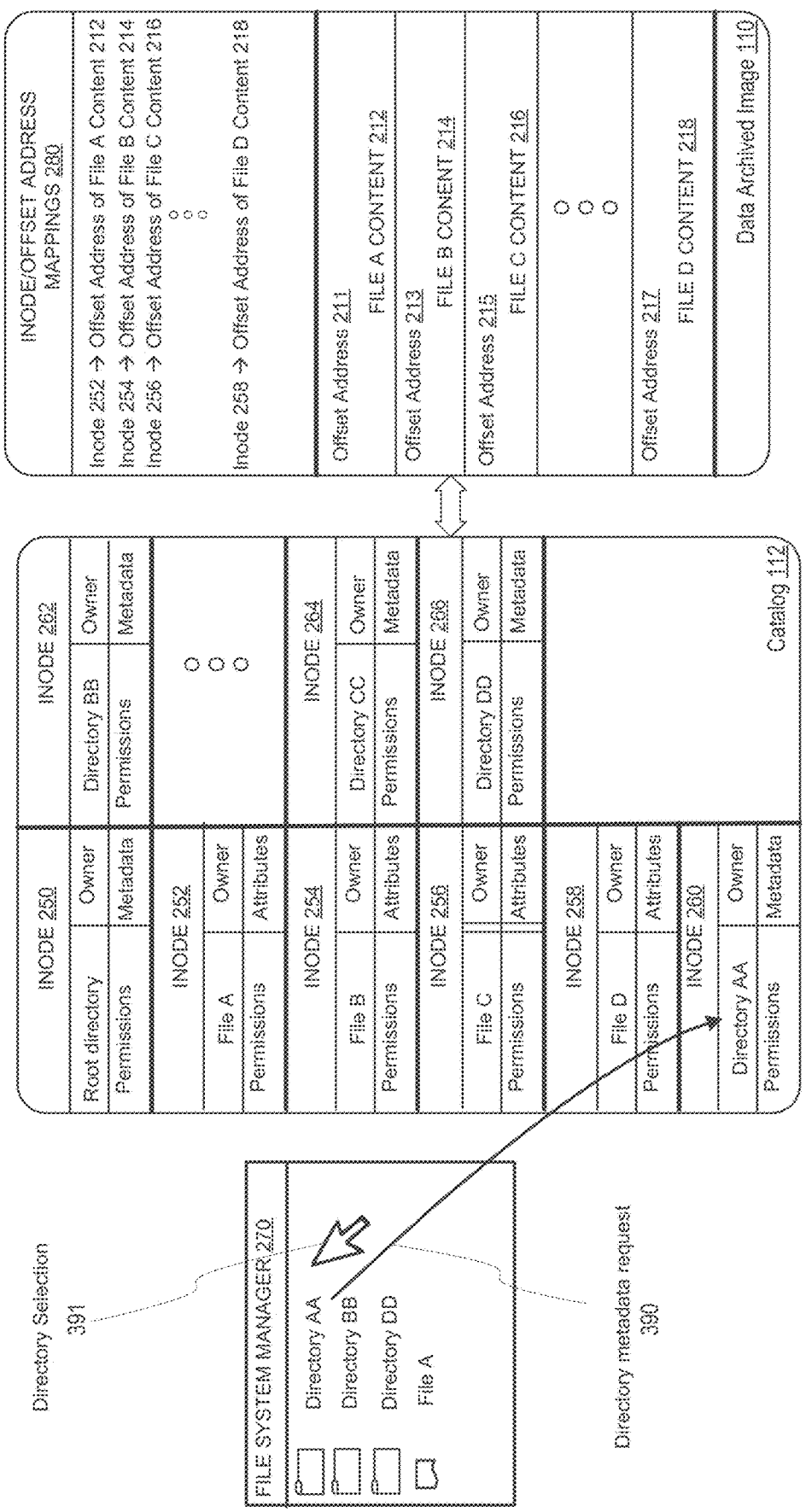
FIG. 3 depicts example relationships among the file system manager interface and data stored in the catalog and the data archived image, in response to a request for a directory traversal.

FIG. 3 depicts example relationships among the file system manager interface and data stored in the catalog and the data archived image, in response to a request for a directory traversal. In particular, FIG. 3 depicts the components of FIG. 2 after a user selects a directory in order to view the subdirectories and files contained in the directory through the interface of the file system manager 270. The directory AA is selected on the interface of the file system manager 270 (see directory selection 391). With reference to FIG. 1, in response to selection of the directory AA, the file system layer 102 sends a request to the interface layer 104 for the directories and files in the directory AA of the data archived image 110.

Figure 4:
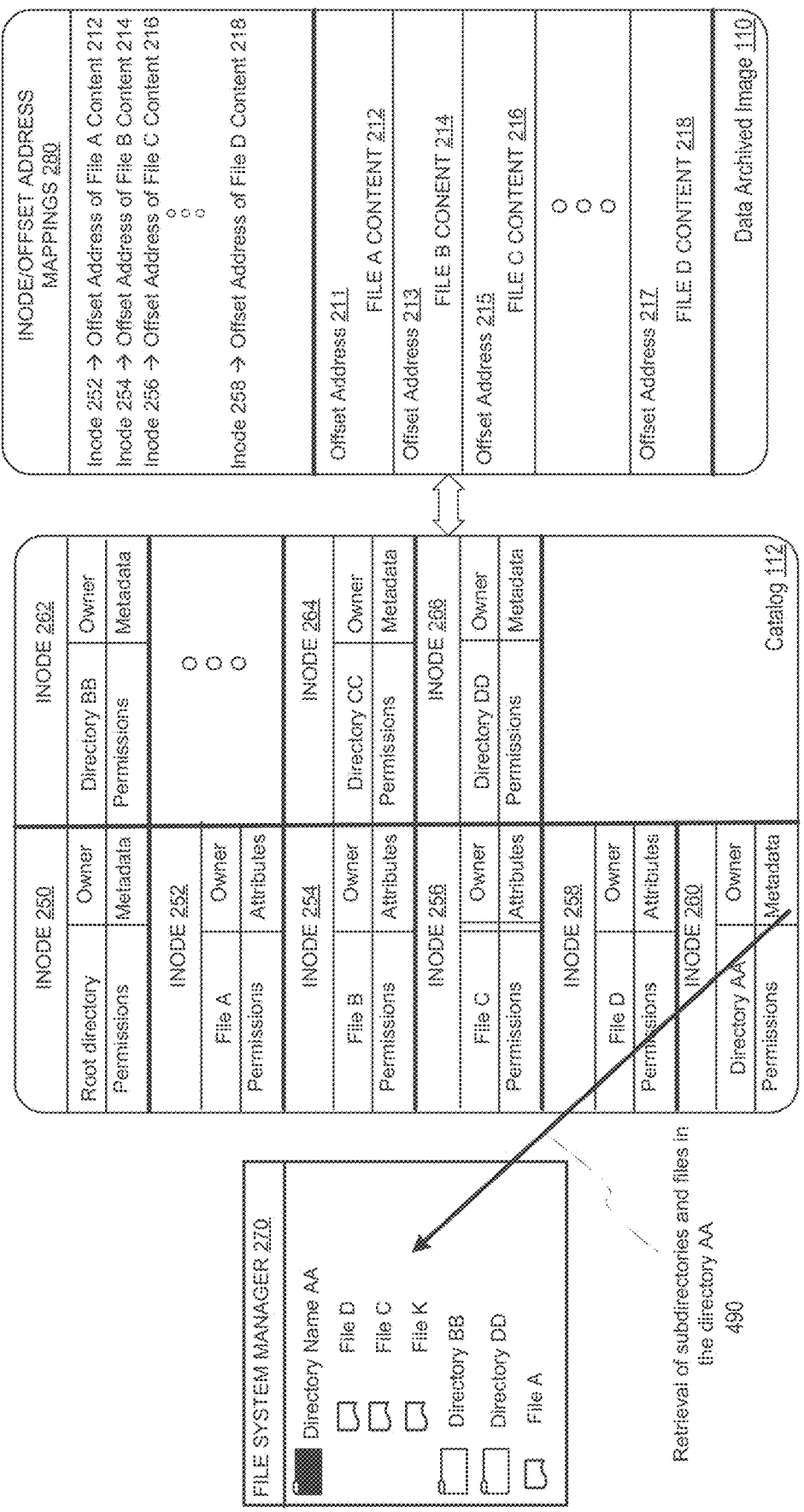
FIG. 4 depicts example relationships among the file system manager interface and data stored in the catalog and the data archived image to provide a response to selection of the directory.

FIG. 4 depicts example relationships among the file system manager interface and data stored in the catalog and the data archived image to provide a response to selection of the directory. In particular, FIG. 4 depicts the components of FIG. 3 to provide the response to selection of the directory AA from the interface of the file system manager 270. With reference to FIG. 1, in response, the interface layer 104 retrieves from the catalog 112 the inode 260 which is the inode for the directory AA for the data archived image 110. The inode 260 includes metadata that provides what directories and files are included in the directory AA. In this example, the metadata indicates that that directories and files in the directory AA include the file D, the file C and the file K. The interface layer 104 returns the names of the directories and files in the directory AA to the file system layer 102. The file system layer 102 can then update the interface of the file system manager 270 as depicted in FIG. 4.

Figure 5:
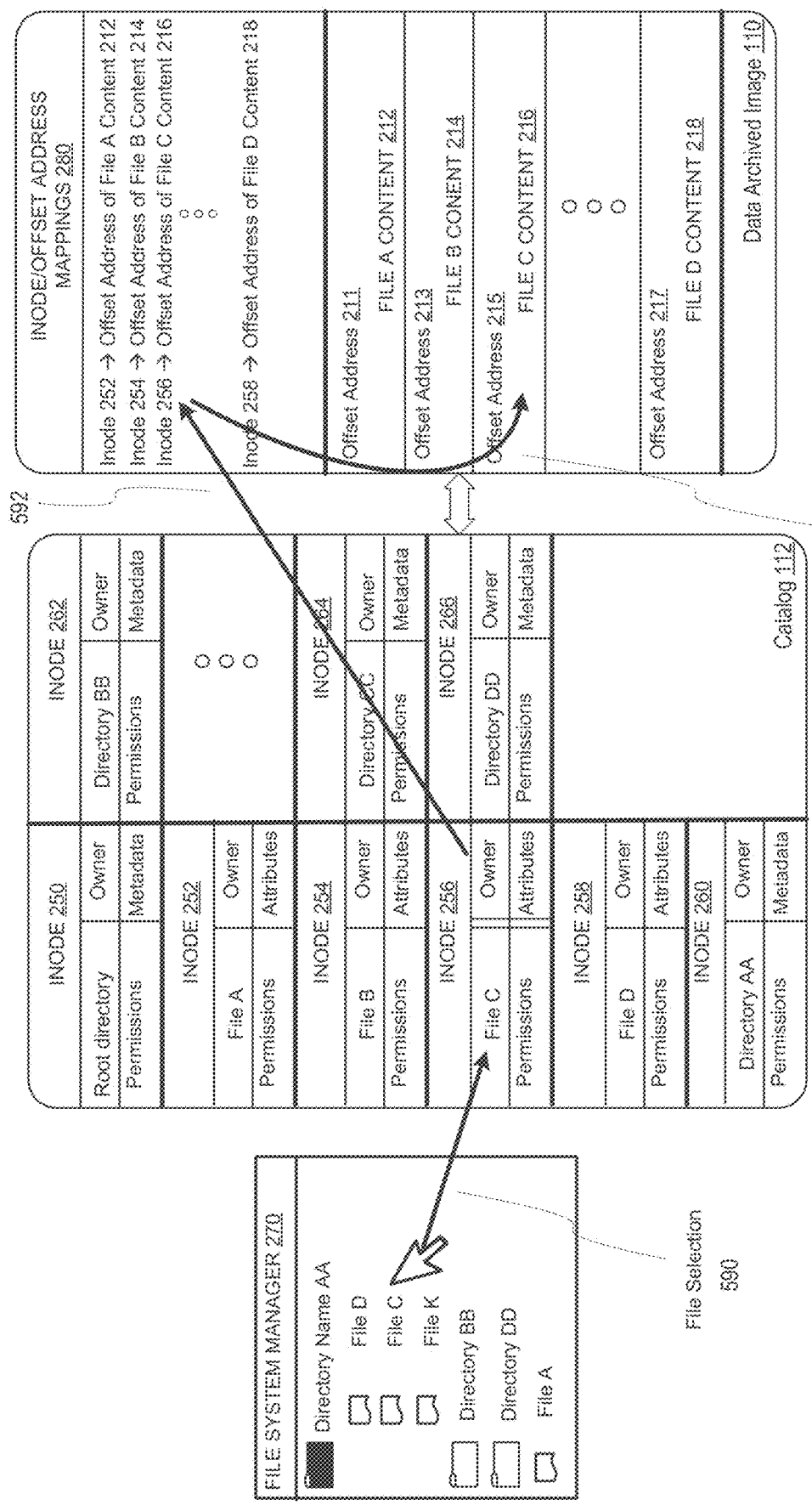
FIG. 5 depicts example relationships among the file system manager interface and data stored in the catalog and the data archived image in a response to selection of a file.

FIG. 5 depicts example relationships among the file system manager interface and data stored in the catalog and the data archived image in a response to selection of a file. For FIG. 5, selection of the file from the interface causes the file to be extracted from the data archived image without decompressing the image. FIG. 5 depicts the components of FIG. 4 in response to selection of the file C from the interface of the file system manager 270 (see file selection 590). With reference to FIG. 1, in response to selection of the file C, the file system layer 102 sends a request to the interface layer 104 to provide the contents of the file C from the data archived image 110. The interface layer 104 retrieves from the catalog 112 the inode 256 which is the inode for the file C for the data archived image 110. The interface layer 104 uses a value or identification of the inode 256 to map the inode 256 to an offset address where the content of the file C is stored in the data archived image 110. In particular, the interface layer 104 uses the address mappings 280 stored in the data archived image 110 to map the inode 256 to the offset address where the content of the file C is stored in the data archived image 110 (see 592). The interface layer 104 then determines the location of the content of the file C in the data archived image 110 using the offset address (see 593).

The interface layer 104 can then perform decompression of any parts of the file that are compressed. Such decompression of any retrieved parts that are compressed can occur without retrieving and decompressing the entire compressed data archived image. In some implementations, the data archived image is compressed using lossless compression such that the original data can be reproduced from the compressed data. The data archived image can be compressed according to a number of compression techniques (e.g., Huffman coding, arithmetic coding, etc.) to replace redundant data with a shortened sequence. To illustrate, a portion of the file can be compressed as follows:

Decompressed portion→Compression portion
ggggnnnnnnqqqqqqqqq→4g6n10q

After retrieving this portion of the file, the interface layer 104 can perform the reverse operation to convert the compressed portion back to the decompressed portion. The interface layer 104 can perform this reverse operation of any compressed portions in the file being retrieved.

Figure 6:
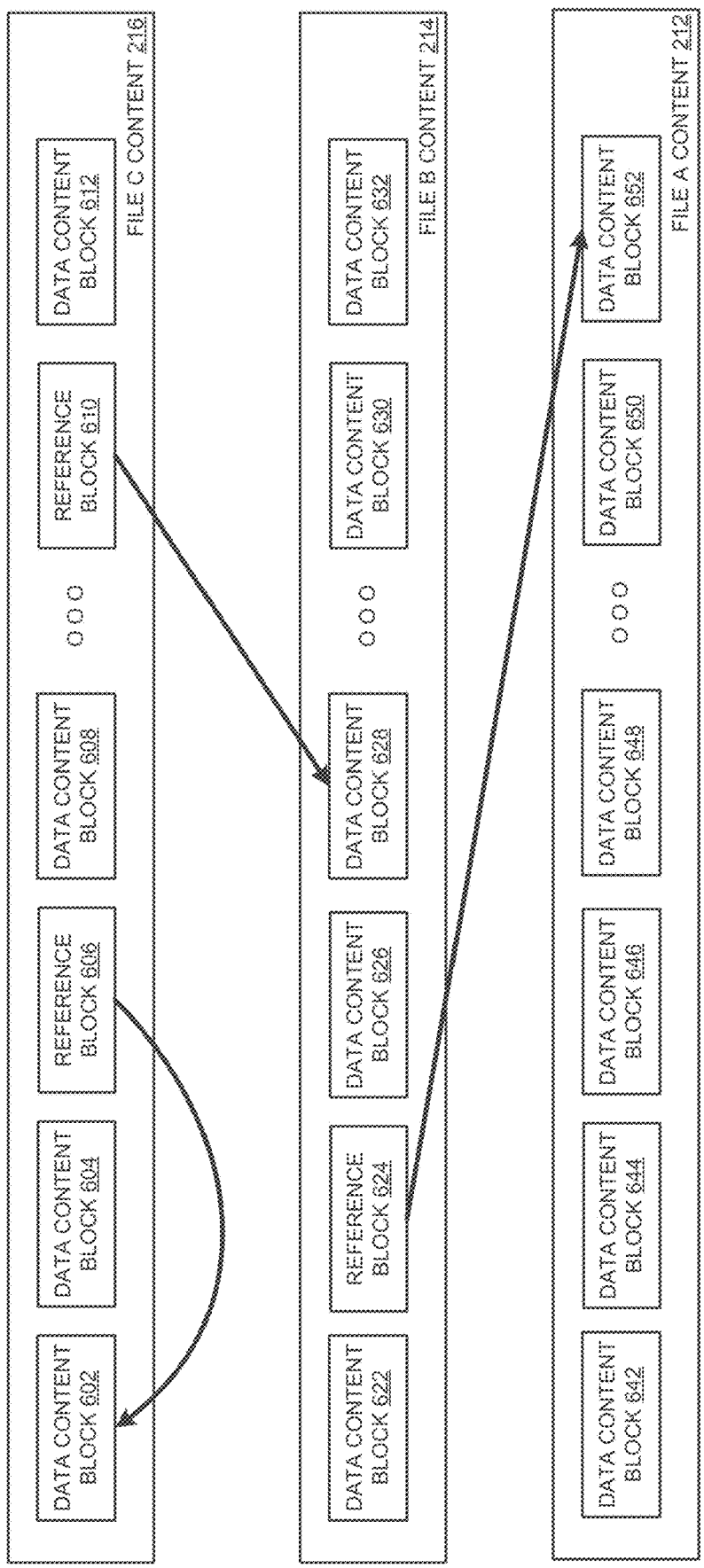
FIG. 6 depicts example file content in a data archived image with deduplication.

In some implementations, deduplication can be performed in addition to or in place of compression of the data archived image. To better, FIG. 6 depicts example file content in a data archived image with deduplication. In this example, duplicated data is removed to provide a compressed result of the image. FIG. 6 depicts the file content A 212, the file content B 214, and the file content C 216. In this example, duplicative content among a same file or different files are eliminated to provide for compression of the data archived image. The files can store blocks such that each block can store actual data content or a reference or pointer to another block. A reference block can be used to point to another block having data content if the two blocks using the same content. Accordingly, the same content can be stored in one block with one or more reference blocks pointing to the one block. A block can be denoted as either a data content block or reference block as part of metadata stored in the associated inode for the file. Alternatively or in addition, the block can be denoted as either data content or a reference in the block itself. For example, a unique identifier can be stored at the beginning of the block to denote that the block is a reference block.

In this example, the file C content 216 includes a number of data content blocks that stores actual data content—a data content block 602, a data content block 604, a data content block 608, and a data content block 612. The file content 212 also includes two reference blocks—a reference block 606 and a reference block 610. The file B content 214 includes a data content block 622, a reference block 624, a data content block 626, a data content block 630, and a data content block 632. The file C content 212 includes a data content block 642, a data content block 644, a data content block 646, a data content block 648, a data content block 650, and a data content block 652.

The reference block 606 points to the data content block 602. The reference block 610 points to the data content block 628. The reference block 624 points to the data content block 652. Accordingly, in response to retrieval of a file that includes a reference block, the interface layer retrieves the data content that the reference block is pointing to be stored at the location of the reference block in the file as part of the file retrieval. Returning to the example of FIG. 5, the interface layer 104 retrieves the file C content 216 from the data archived image 110. The interface layer 104 retrieves the first two data blocks from the file C content 216—the data content block 602 and the data content block 604 starting at the offset address 215. The interface layer 104 retrieves the reference block 606, which is a pointer to the data content block 602. In response, the interface layer 104 retrieves the data content block 602 for inclusion at the location for the reference block 606 as part of retrieval of file C. Thus, there are two copies of the content in the data content block 602 for retrieval of file C. The interface layer 104 retrieves the data content block 608.

The interface layer 104 then retrieves the reference block 610, which is a pointer to the data content block 628. In response, the interface layer 104 retrieves the data content block 628 for inclusion at the location for the reference block 610 as part of retrieval of file C. The interface layer 104 then retrieves the data content block 612.

Figure 7:
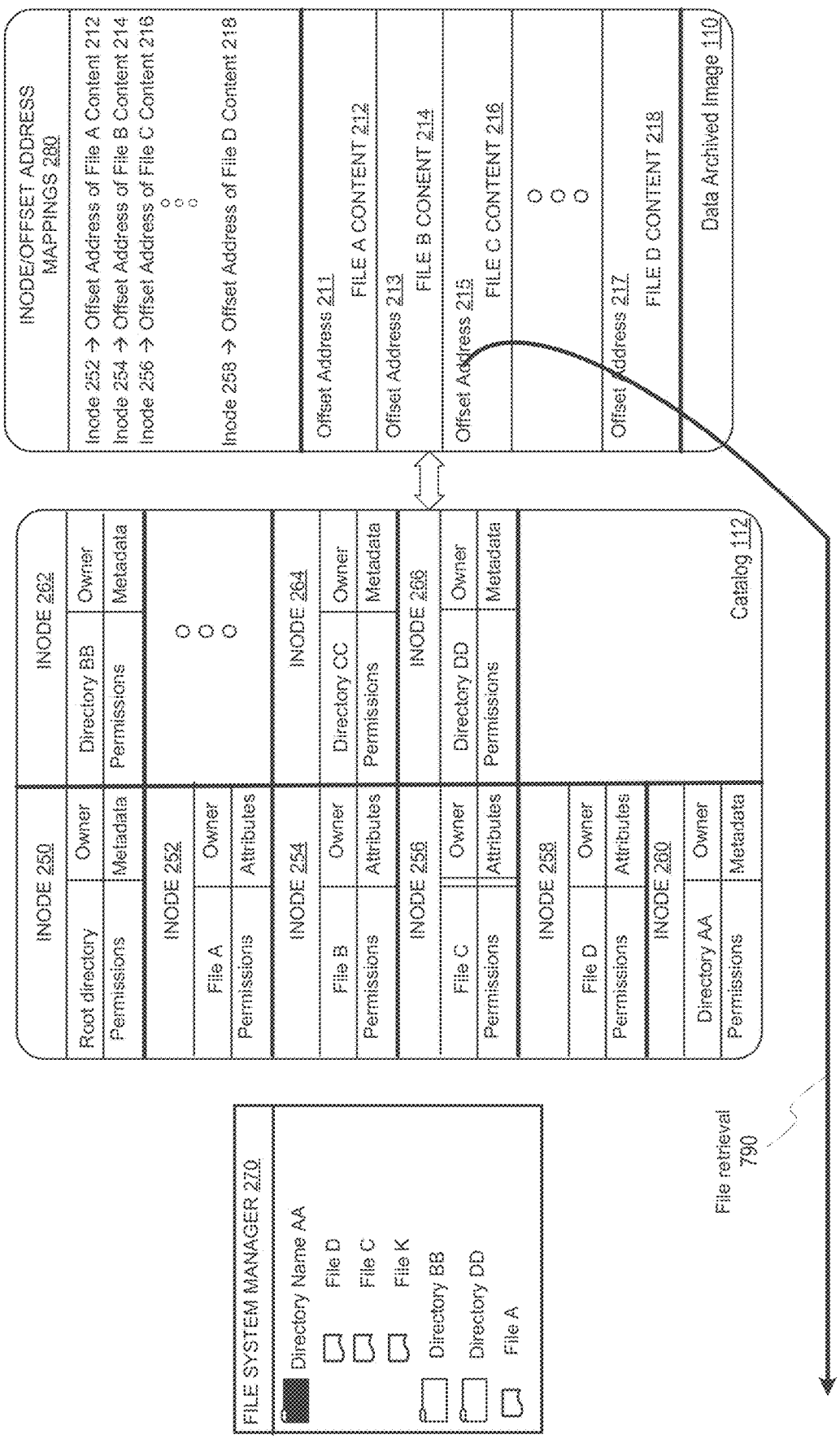
FIG. 7 depicts example relationships among the file system manager interface and data stored in the catalog and the data archived image to provide a response to selection of the file.

FIG. 7 depicts example relationships among the file system manager interface and data stored in the catalog and the data archived image to provide a response to selection of the file. In particular, FIG. 7 depicts the components of FIG. 5 to provide the response to selection of the file C from the interface of the file system manager 270. With reference to FIG. 1, the interface layer 104 can determine a length of the file (ending offset address) for extracting the content 216 based on the attributes included in the inode 256 for the file C. The interface layer 104 extracts the content 216 of the file C starting at the offset address 215 and for the length defined in the attributes in the inode 256. The interface layer 104 returns the extracted content for the file C to the file system layer 102. The file system layer 102 can then provide the content to the interface of the file system manager 270. The file system manager 270 can then initiate execution of another application (e.g., word processing application) to display the content of the file C on the client device 111.

Example Browsable Data and Data Retrieval Operations

Figure 8:
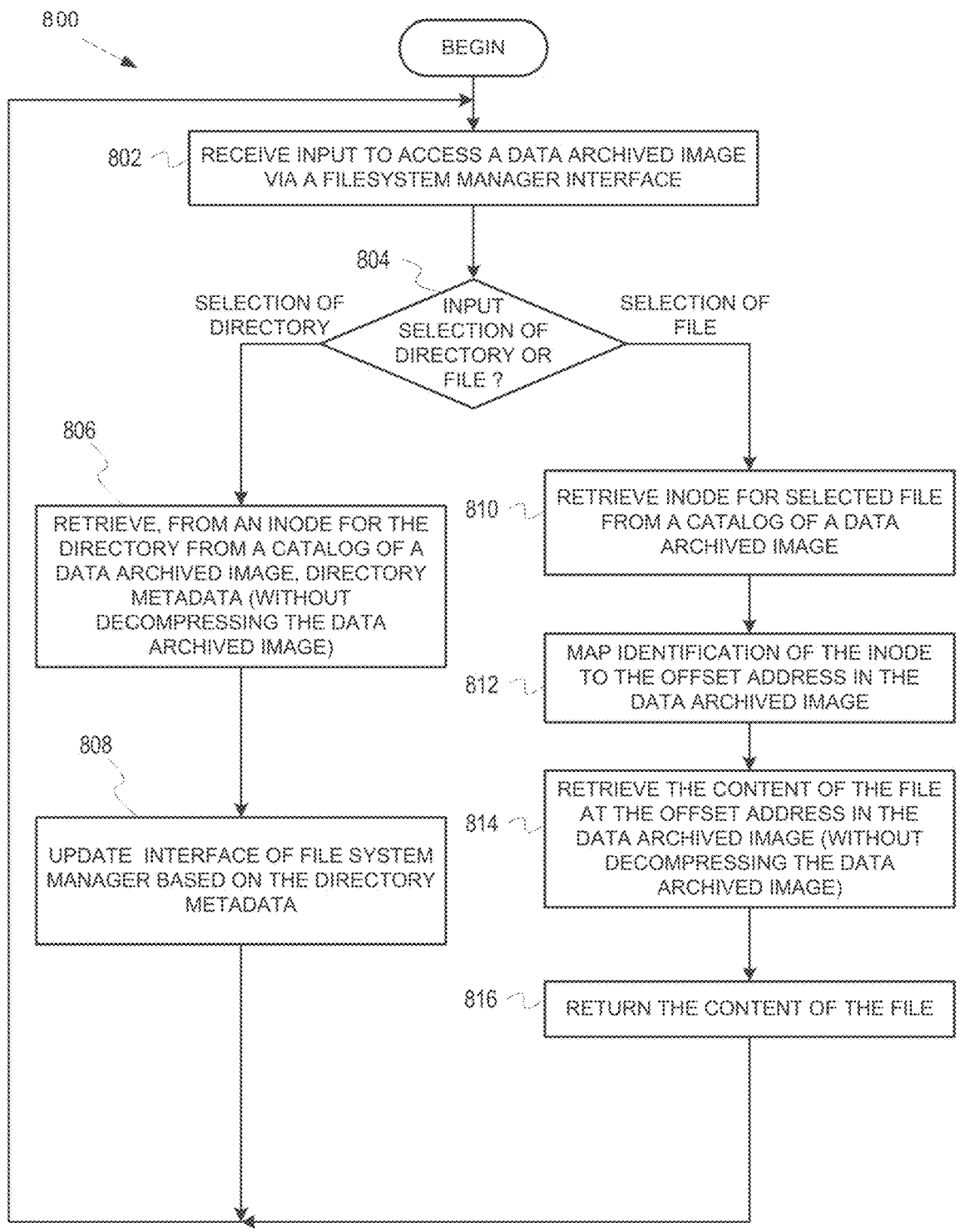
FIG. 8 depicts a flowchart of operations for browsable data and data retrieval from a data archived image.

FIG. 8 depicts a flowchart of operations for browsable data and data retrieval from a data archived image. A flowchart 800 is described with reference to FIGS. 1-7. Operations of the flowchart 800 can be performed by software, firmware, hardware or a combination thereof. For example, the operations can be performed by the interface layer 104 depicted in FIG. 1. The operations of the flowchart 800 start at block 802.

At block 802, input to access a data archived image is received via a file system manager interface. For example, a user can input selection of a file to extract from a data archived image or selection of a directory to traverse within the data archived image. With reference to FIG. 1, a user can input, using the client device 111, a request to access the data archived image 110. For example, the user can select a file or directory through the file system manager 270 depicted in FIGS. 2-5 and 7.

At block 804, a determination of whether the input is selection of a directory or a file. With reference to FIGS. 1-2, the file system layer 102 can make this determination based on whether a directory or file is selected on the file system manager 270 based on user input. If a directory is selected, operations of the flowchart 800 continue at block 806. If a file is selected, operations of the flowchart 800 continue at block 810.

At block 806, directory metadata is retrieved from the inode for the selected directory from the catalog for the data archived image. With reference to FIGS. 1 and 3, the directory AA was selected on the interface provide by the file system manager 270. In response, the interface layer 104 retrieves from the catalog 112 the inode 260 which is the inode for the directory AA for the data archived image 110. The inode 260 includes metadata that provides what directories and files are included in the directory AA. In this example, the metadata indicates that that directories and files in the directory AA include the file D, the file C and the file K.

At block 808, the interface of the file system manager is updated based on the directory metadata. With reference to FIG. 1, the interface layer 104 returns the names of the directories and files in the directory AA to the file system layer 102. The file system layer 102 can then update the interface of the file system manager 270 as depicted in FIG. 4. From this point in the flowchart 800, operations return to block 802 to receive another input to access the data archived image. These operations of the flowchart 800 can continue until the file system manager is closed, another data archived image is selected, etc.

At block 810, the inode for the selected file is retrieved from a catalog for the data archived image. With reference to the example depicted in FIG. 5, the selected file is file C. The interface layer 104 retrieves from the catalog 112 the inode 256 which is the inode for the file C for the data archived image 110.

At block 812, identification of the inode is mapped to an offset address in the data archived image where content of the selected file is stored. With reference to FIG. 5, the interface layer 104 uses a value or identification of the inode 256 to map the inode 256 to an offset address where the content of the file C is stored in the data archived image 110. In particular, the interface layer 104 uses the address mappings 280 stored in the data archived image 110 to map the inode 256 to the offset address where the content of the file C is stored in the data archived image 110 (see 592). The interface layer 104 then determines the location of the content of the file C in the data archived image 110 using the offset address (see 593).

At block 814, the content of the selected file is retrieved at the offset address in the data archived image (without decompressing the image). With reference to FIG. 5, the interface layer 104 can determine a length of the file (ending offset address) for extracting the content 216 based on the attributes included in the inode 256 for the file C. The interface layer 104 then extracts the content 216 of the file C starting at the offset address 215 and for the length defined in the attributes in the inode 256.

At block 816, the content of the selected file is returned. With reference to FIG. 5, the interface layer 104 returns the extracted content for the file C to the file system layer 102. The file system layer 102 can provide the content to the interface of the file system manager 270. The file system manager 270 can then initiate execution of another application (e.g., word processing application) to display the content of the file C on the client device 111. From this point in the flowchart 800, operations return to block 802 to receive another input to access the data archived image.

Example Computer Device

Figure 9:
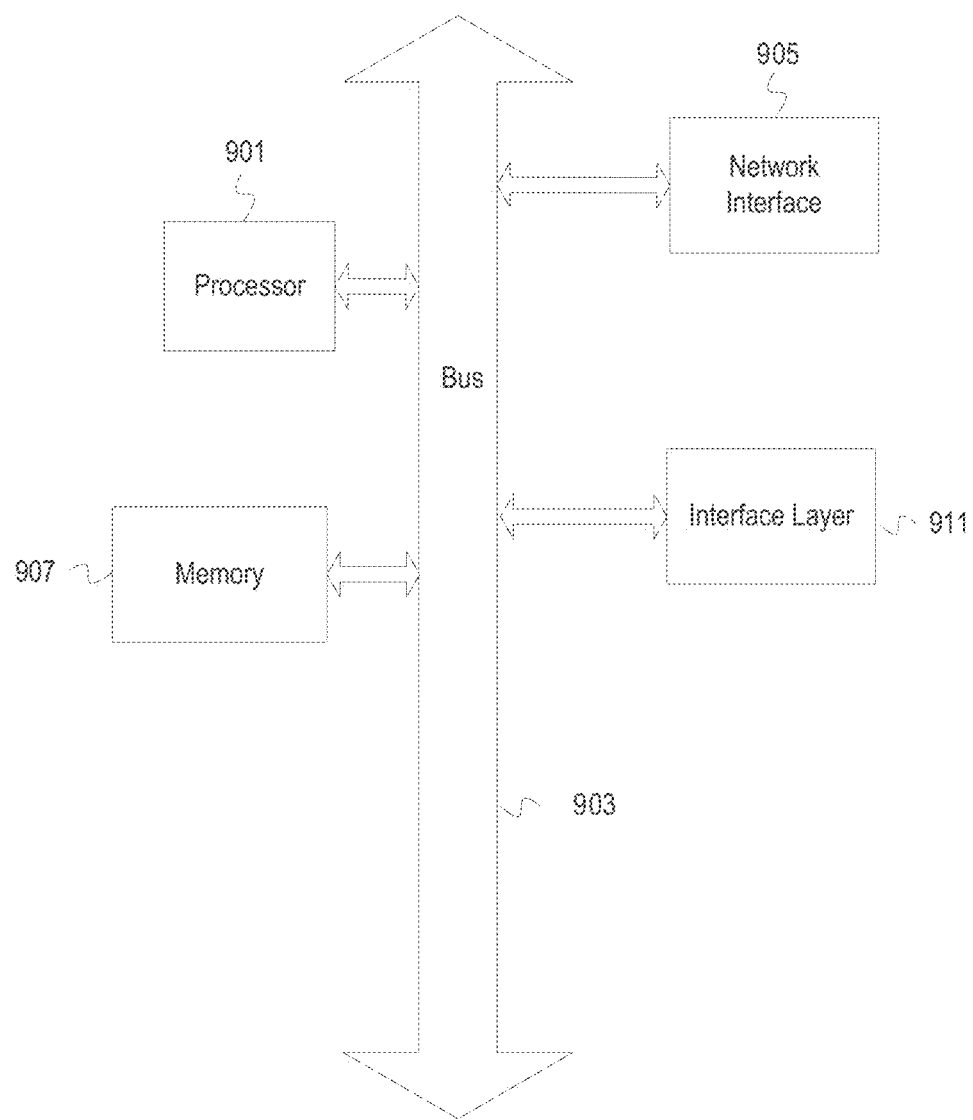
FIG. 9 depicts an example computer device for accessing a data archived image.

FIG. 9 depicts an example computer device for accessing a data archived image. The computer device includes a processor 901 (possibly including multiple processors, multiple cores, multiple nodes, and/or implementing multithreading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.). The system communicates via transmissions to and/or from remote devices via the network interface 905 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The system also includes an interface layer 911. The interface layer 911 provides functionalities to access a data archived image without decompressing the image (as described above). Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

Variations

The examples often refer to an interface layer. The interface layer is a construct used to refer to implementation of functionality for providing browsable data and data retrieval from a data archived image. This construct is utilized since numerous implementations are possible. The interface layer may be a particular component or components of a machine (e.g., a particular circuit card enclosed in a housing with other circuit cards/boards), machine-executable program or programs, firmware, a circuit card with circuitry configured and programmed with firmware for functionality described herein, etc. The term is used to efficiently explain content of the disclosure. Although the examples refer to operations being performed by the interface layer, different entities can perform different operations. For instance, a dedicated co-processor or application specific integrated circuit can perform functionality described herein.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, operations of the flowchart 800 can be performed concurrently to access different data archived images by a same or different client device. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for browsable data and data retrieval from a data archived image as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
providing a client with browsing capabilities for navigating a directory structure of a compressed image while in a compressed state; and
in response to receiving a selection of a first name of first content from the client:
retrieving an inode for the first content from a catalog for the compressed image;
evaluating metadata of the inode to identify second content within the first content;
retrieving a second name of the second content stored within the compressed image; and
performing a traversal of the directory structure to provide the client with the second name of the second content for traversal or retrieval of the second content.

2. The method of claim 1, wherein the second content comprises a file available for retrieval, and the method comprising:
in response to receiving a selection of the file, retrieving a second inode of the file from the catalog based upon a filename of the file.

3. The method of claim 2, comprising:
retrieving an offset address of a location of the file in the compressed image based upon the second inode, wherein the offset address is used to retrieve the file.

4. The method of claim 3, wherein the offset address is retrieved from a mapping stored within the compressed image.

5. The method of claim 1, wherein data of a plurality of files is contiguously stored within the compressed image.

6. The method of claim 1, comprising:
compressing a plurality of files to create the compressed image to store within a backup storage device.

7. The method of claim 1, wherein the second content comprises a directory.

8. The method of claim 7, comprising:
in response to receiving a selection of the directory, determining that a second traversal of the directory structure is to be performed.

9. The method of claim 8, comprising:
performing the second traversal to retrieve a third name of third content within the directory from directory metadata.

10. The method of claim 9, comprising:
providing the client with the third name of the third content for traversal or retrieval.

11. The method of claim 1, wherein the compressed image comprises a deduplicated compressed image.

12. The method of claim 2, wherein the file comprises a data block and a reference pointing to duplicative data stored at a first location within a deduplicated compressed image that is different than a second location of the file.

13. The method of claim 12, comprising:
utilizing the reference to retrieve the duplicative data from the first location.

14. The method of claim 13, wherein the duplicative data is retrieved while the compressed image is in the compressed state.

15. A non-transitory machine readable medium comprising instructions for performing a method, which when executed by a machine, causes the machine to:
provide a client with browsing capabilities for navigating a directory structure of a compressed image while in a compressed state; and
in response to receiving a selection of a first name of first content from the client:
retrieve an inode for the first content from a catalog for the compressed image;
evaluate metadata of the inode to identify second content within the first content;
retrieve a second name of the second content stored within the compressed image; and
perform a traversal of the directory structure to provide the client with the second name of the second content for traversal or retrieval of the second content.

16. The non-transitory machine readable medium of claim 15, wherein the second content comprises a file available for retrieval, and wherein the instructions cause the machine to:
in response to receiving a selection of the file, retrieve a second inode of the file from the catalog based upon a filename of the file.

17. The non-transitory machine readable medium of claim 16, wherein the instructions cause the machine to:
retrieve an offset address of a location of the file in the compressed image based upon the second inode, wherein the offset address is used to retrieve the file.

18. The non-transitory machine readable medium of claim 17, wherein the offset address is retrieved from a mapping stored within the compressed image.

19. A computing device comprising:
a memory comprising machine executable code for performing a method; and
a processor coupled to the memory, the processor configured to execute the machine executable code to cause the processor to:
provide a client with browsing capabilities for navigating a directory structure of a compressed image while in a compressed state; and
in response to receiving a selection of a first name of first content from the client:
retrieve an inode for the first content from a catalog for the compressed image;
evaluate metadata of the inode to identify second content within the first content;
retrieve a second name of the second content stored within the compressed image; and
perform a traversal of the directory structure to provide the client with the second name of the second content for traversal or retrieval of the second content.

20. The computing device of claim 19, wherein the second content comprises a file available for retrieval, and wherein the machine executable code causes the processor to:
in response to receiving a selection of the file, retrieve a second inode of the file from the catalog based upon a filename of the file.

* * * * *